(12) United States Patent
Park et al.

(10) Patent No.: US 10,278,127 B2
(45) Date of Patent: Apr. 30, 2019

(54) POWER SAVE MODE-BASED OPERATING METHOD AND APPARATUS IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 15/502,489

(22) PCT Filed: Feb. 5, 2015

(86) PCT No.: PCT/KR2015/001197
§ 371 (c)(1),
(2) Date: Feb. 7, 2017

(87) PCT Pub. No.: WO2016/021792
PCT Pub. Date: Feb. 11, 2016

(65) Prior Publication Data
US 2017/0251432 A1    Aug. 31, 2017

Related U.S. Application Data

(60) Provisional application No. 62/034,162, filed on Aug. 7, 2014, provisional application No. 62/039,924, filed on Aug. 21, 2014.

(51) Int. Cl.
*H04W 52/02* (2009.01)
*H04W 84/12* (2009.01)
(Continued)

(52) U.S. Cl.
CPC ..... *H04W 52/0229* (2013.01); *H04W 40/244* (2013.01); *H04W 52/028* (2013.01);
(Continued)

(58) Field of Classification Search
CPC .......... H04W 52/0229; H04W 52/028; H04W 72/0446; H04W 72/0413; H04W 40/244; H04W 84/12; H04L 69/323
See application file for complete search history.

(56) References Cited

U.S. PATENT DOCUMENTS

2007/0211654 A1* 9/2007 Kim ................ H04W 52/0225
370/318
2011/0222453 A1* 9/2011 Kwon ............. H04W 52/0235
370/311
(Continued)

FOREIGN PATENT DOCUMENTS

| KR | 10-2012-0086110 | 8/2012 |
| KR | 101234262 | 2/2013 |

(Continued)

OTHER PUBLICATIONS

IEEE Draft P802.11 8.3.3.2., Prepared by the 802.11 REVmb/D12, Nov. 2011, Working Group of the LAN/MAN Standards Committee of the IEEE Computer Society, "Part 11: Wireless LAN Medium Access Control (MAC) and Physical Layer (PHY) Specifications," "Beacon frame format," Copyright 2011, 6 pgs.
(Continued)

*Primary Examiner* — Rina C Pancholi
(74) *Attorney, Agent, or Firm* — Lee, Hong, Degerman, Kang & Waimey

(57) ABSTRACT

Disclosed are a power save mode-based operating method and apparatus in a wireless LAN. The power save mode-based operating method in a wireless LAN comprises the steps of: receiving, by an STA, overheard BSS information
(Continued)

from an AP; receiving, by the STA, a PPDU, wherein the PPDU includes information on a BSS having transmitted the PPDU; determining, by the STA, whether the overheard BSS information includes the information on the BSS; and switching an awake state to a doze state when the STA determines whether the overheard BSS information includes the information on the BSS, wherein the overheard BSS information can include the information on at least one overheard BSS for transmitting a frame enabled to be overheard by the AP.

10 Claims, 14 Drawing Sheets

(51) Int. Cl.
*H04W 40/24* (2009.01)
*H04W 72/04* (2009.01)
*H04L 29/08* (2006.01)

(52) U.S. Cl.
CPC ... *H04W 72/0413* (2013.01); *H04W 72/0446* (2013.01); *H04W 84/12* (2013.01); *H04L 69/323* (2013.01); *Y02D 70/00* (2018.01); *Y02D 70/1262* (2018.01); *Y02D 70/142* (2018.01); *Y02D 70/22* (2018.01)

(56) References Cited

U.S. PATENT DOCUMENTS

| | | | | |
|---|---|---|---|---|
| 2011/0286375 | A1* | 11/2011 | Chu | H04W 52/0216 370/311 |
| 2012/0188923 | A1* | 7/2012 | Kwon | H04W 52/0212 370/311 |
| 2012/0257574 | A1* | 10/2012 | Seok | H04W 72/082 370/328 |
| 2013/0121160 | A1* | 5/2013 | Chung | H04W 72/082 370/241 |
| 2013/0235773 | A1* | 9/2013 | Wang | H04W 52/0206 370/311 |
| 2015/0110093 | A1* | 4/2015 | Asterjadhi | H04W 74/08 370/338 |
| 2015/0264617 | A1* | 9/2015 | Choudhury | H04W 36/30 370/332 |
| 2015/0312793 | A1* | 10/2015 | Jeon | H04W 28/0205 370/329 |
| 2015/0341880 | A1* | 11/2015 | Seok | H04W 52/0216 370/350 |
| 2016/0227441 | A1* | 8/2016 | Park | H04W 74/0816 |
| 2016/0330788 | A1* | 11/2016 | Zheng | H04W 28/0205 |
| 2016/0345258 | A1* | 11/2016 | Zhou | H04W 52/0206 |

FOREIGN PATENT DOCUMENTS

| | | | |
|---|---|---|---|
| KR | 20130052098 | 5/2013 | |
| KR | 101351573 | 2/2014 | |
| KR | 1020140060561 | 5/2014 | |
| WO | WO-2013119095 A1 * | 8/2013 | ........ H04W 52/0216 |

OTHER PUBLICATIONS

IEEE Draft P802.11 8.3.3.5.-8.3.3.6., Prepared by the 802.11 REVmb/D12, Nov. 2011, Working Group of the LAN/MAN Standards Committee of the IEEE Computer Society, "Part 11: Wireless LAN Medium Access Control (MAC) and Physical Layer (PHY) Specifications," "Association Request frame format," "Association Response frame format," Copyright 2011, 3 pgs.
IEEE Draft P802.11 8.3.3.9., Prepared by the 802.11 REVmb/D12, Nov. 2011, Working Group of the LAN/MAN Standards Committee of the IEEE Computer Society, "Part 11: Wireless LAN Medium Access Control (MAC) and Physical Layer (PHY) Specifications," "Probe Request frame format," Copyright 2011, 3 pgs.
IEEE Draft P802.11 8.5.8.3., Prepared by the 802.11 REVmb/D12, Nov. 2011, Working Group of the LAN/MAN Standards Committee of the IEEE Computer Society, "Part 11: Wireless LAN Medium Access Control (MAC) and Physical Layer (PHY) Specifications," "Measurement Pilot frame format," Copyright 2011, 3 pgs.
IEEE Draft P802.11 8.3.3.10, Prepared by the 802.11 REVmb/D12, Nov. 2011, Working Group of the LAN/MAN Standards Committee of the IEEE Computer Society, "Part 11: Wireless LAN Medium Access Control (MAC) and Physical Layer (PHY) Specifications," "Probe Response frame format," Copyright 2011, 5 pgs.
IEEE Draft P802.11 8.3.3.11, Prepared by the 802.11 REVmb/D12, Nov. 2011, Working Group of the LAN/MAN Standards Committee of the IEEE Computer Society, "Part 11: Wireless LAN Medium Access Control (MAC) and Physical Layer (PHY) Specifications," "Authentication frame format," Copyright 2011, 3 pgs.
PCT International Application No. PCT/KR2015/001197, International Search Report dated May 11, 2015, 4 pages.
Korean Intellectual Property Office Application No. 10-2017-7003205, Office Action dated Feb. 7, 2018, 3 pages.

* cited by examiner

FIG. 1
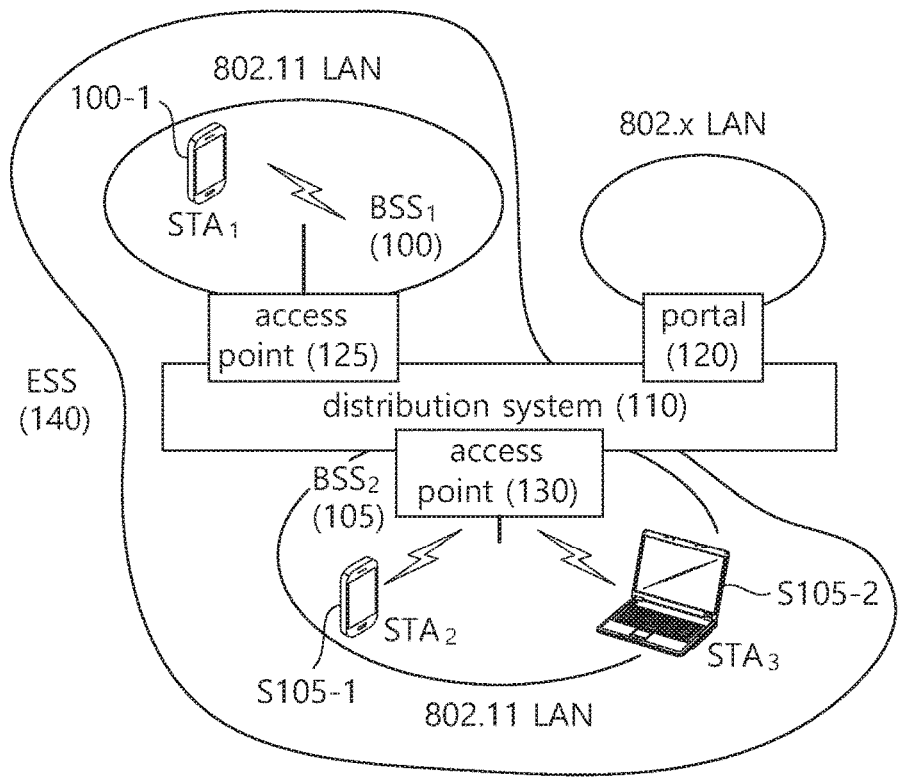
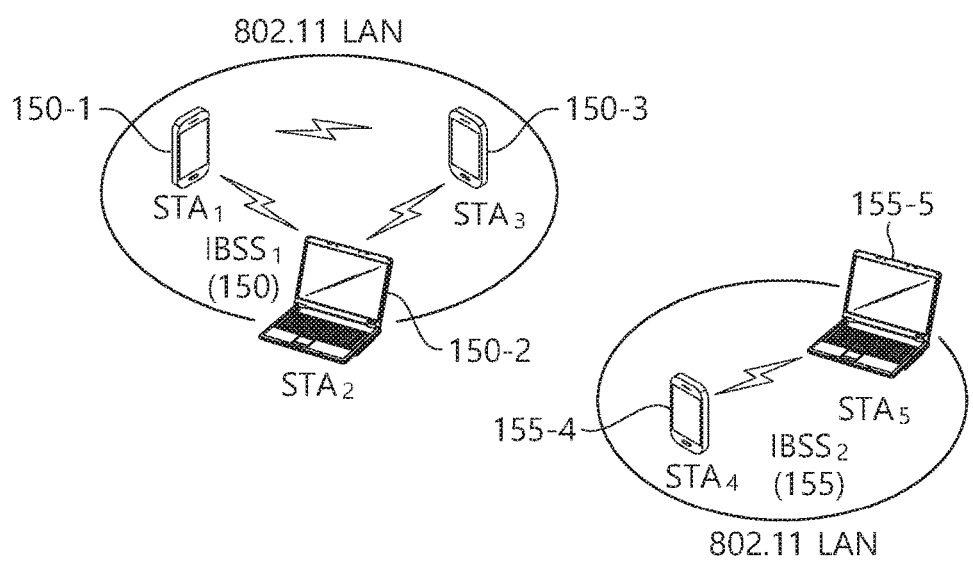

POWER SAVE MODE-BASED OPERATING METHOD AND APPARATUS IN WIRELESS LAN

CROSS-REFERENCE TO RELATED APPLICATIONS

This application is the National Stage filing under 35 U.S.C. 371 of International Application No. PCT/KR2015/001197, filed on Feb. 5, 2015, which claims the benefit of U.S. Provisional Application Nos. 62/034,162, filed on Aug. 7, 2014, and 62/039,924, filed on Aug. 21, 2014, the contents of which are all hereby incorporated by reference herein in their entirety.

BACKGROUND OF THE INVENTION

Field of the Invention

The present invention relates to wireless communication, and more particularly, to a method and apparatus for operating based on a power save mode in a wireless local area network (WLAN).

Related Art

An IEEE 802.11 standard provides a power save mechanism (or power save mode) to increase the lifespan of a wireless local area network (WLAN) station (STA). The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption.

If the STA operates for a long time in the doze state, power consumption of the STA is reduced. Therefore, the lifespan of the STA may be increased. However, frame transmission or reception is impossible in the doze state. Therefore, the STA cannot stay for a long time in the doze state. If a pending frame is generated in the doze state, the STA may transition to the awake state to transmit the frame to an access point (AP). However, if the STA is in the doze state and a pending frame to be transmitted to the STA exists in the AP, the STA cannot receive the pending frame from the AP, and cannot know that the pending frame exists in the AP. Therefore, the STA may acquire information regarding the presence/absence of the pending frame in the AP, and may operate by periodically transitioning to the awake mode in order to receive the pending frame in the AP.

The AP may acquire information regarding awake mode operating timing of the STA, and may transmit the information regarding the presence of the pending frame in the AP according to the awake mode operating timing of the STA.

More specifically, in order to receive information regarding the presence/absence of a frame to be received from the AP, the STA may periodically transition from the doze state to the awake state to receive a beacon frame. The AP may report the presence/absence of a frame to be transmitted to each STA on the basis of a traffic indication map (TIM) included in the beacon frame. The TIM is used to report the presence of a unicast frame to be transmitted to the STA, and a delivery traffic indication map (DTIM) may be used to report the presence of a multicast frame/broadcast frame to be transmitted to the STA.

SUMMARY OF THE INVENTION

The present invention provides an operating method based on a power save mode in a wireless local area network (WLAN).

The present invention also provides an operating method based on a power save mode in a WLAN.

According to an aspect of the present invention, there is provided an operating method based on a power save mode in a WLAN. The method may include receiving, by a station (STA), overhear basic service set (BSS) information from an access point (AP), receiving, by the STA, a physical layer protocol data unit (PPDU). The PPDU may include information on a BSS having transmitted the PPDU, determining, by the STA, whether the overhear BSS information includes the information on the BSS, and transitioning the STA from an awake state to a doze state if the overhear BSS information includes the information on the BSS. The overhear BSS information may include information on at least one overhear BSS for transmitting a frame which can be overheard by the AP.

According to another aspect of the present invention, there is provided an STA operating based on a power save mode in a WLAN. The STA may include a radio frequency (RF) unit for transmitting or receiving a radio signal, and a processor operatively coupled to the RF unit. The processor may be configured for receiving overhear BSS information from an AP, receiving a PPDU, determining whether the overhear BSS information includes information on the BSS, and transitioning from an awake state to a doze state if the overhear BSS information includes the information on the BSS. The PPDU may include information on a BSS having transmitted the PPDU. The overhear BSS information may include information on at least one overhear BSS for transmitting a frame which can be overheard by the AP.

An STA operating in an active mode can transition to a doze state on the basis of whether it is a frame transmitted by other BSSs. Therefore, power of the STA can be saved, and an operating time of the STA operating based on a battery can be increased.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
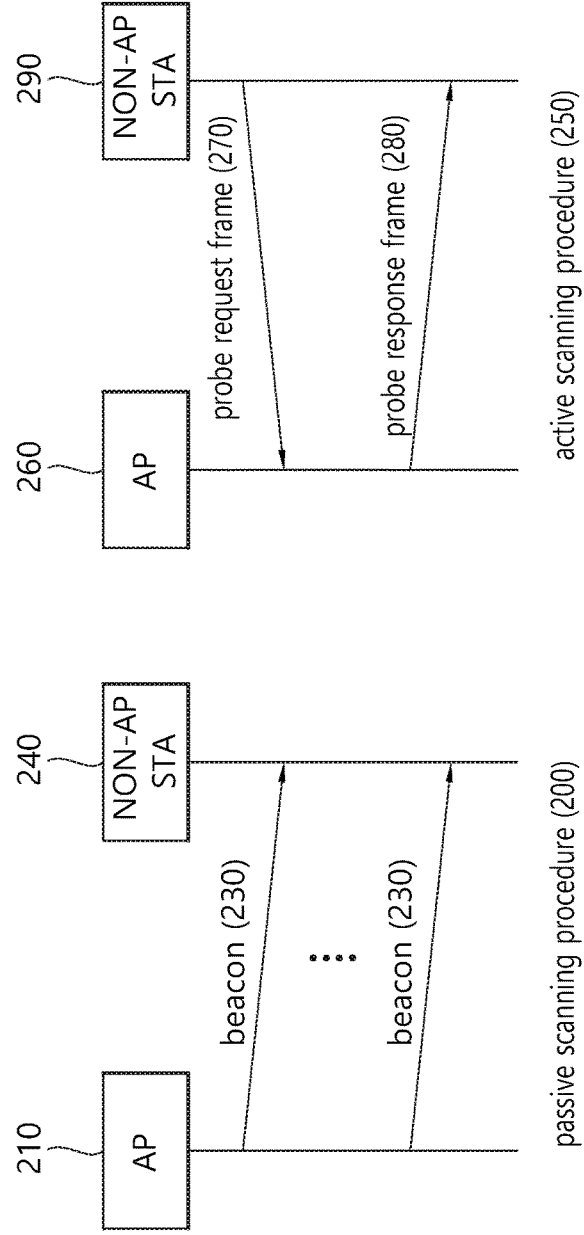
FIG. 2 is a conceptual view illustrating a scanning method in a WLAN.

FIG. 1 is a conceptual view illustrating the structure of a wireless local area network (WLAN).

An upper part of FIG. 1 shows the structure of the institute of electrical and electronic engineers (IEEE) 802.11 infrastructure network.

Referring to the upper part of FIG. 1, the WLAN system may include one or more basic service sets (BSSs) 100 and 105. The BSS 100 or 105 is a set of an access point (AP) such as AP 125 and a station (STA) such as STA1 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same service set identification (SSID).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent basic service set (BSS).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as mobile terminal, wireless device, wireless transmit/receive unit (WTRU), user equipment (UE), mobile station (MS), mobile subscriber unit, or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

FIG. 2 is a conceptual view illustrating a scanning method in a wireless LAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhear, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Additionally, a FILS discovery frame may also be defined. As a frame being transmitted from each AP inbetween the transmission cycle periods of the beacon frame, the FILS discovery frame may correspond to a frame that is transmitted while having a cycle period that is shorter than the beacon frame. More specifically, the FILS discovery frame corresponds to a frame that is being transmitted while having a transmission cycle period that is shorter than the beacon frame. The FILS discovery frame may include identifier information (SSID, BSSID) of the AP transmitting the discovery frame. The FILS discovery frame may be transmitted before the beacon frame is transmitted to the STA, so as to allow the STA to discover in advance that an AP exists within the corresponding channel. An interval at which the FILS discovery frame is transmitted is referred to as a FILS discovery frame transmission interval. The FILS discovery frame may be transmitted while including a portion of the information included in the beacon frame.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhear increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
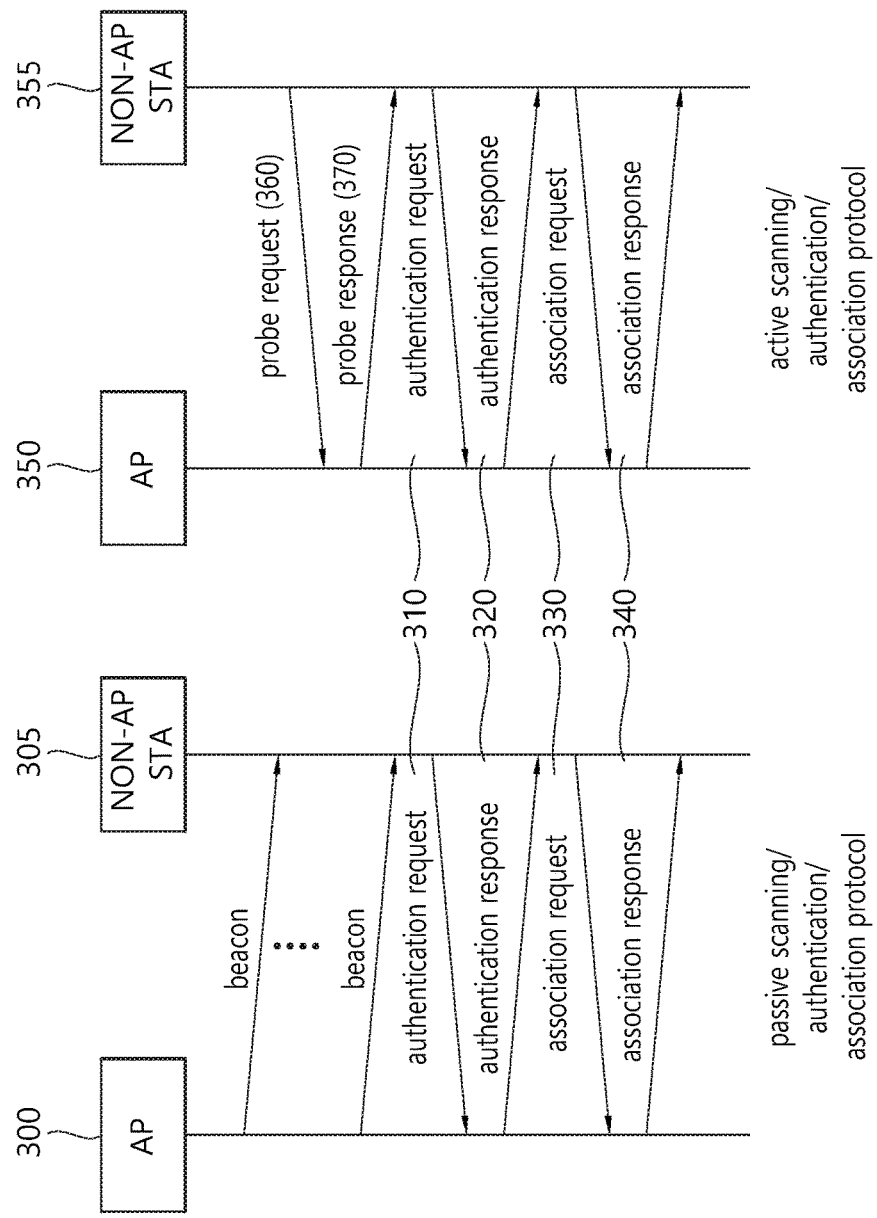
FIG. 3 is a conceptual view illustrating an authentication procedure and an association procedure being performed after a scanning procedure of an access point (AP) and a station (STA).

FIG. 3 is a conceptual view illustrating an authentication procedure and an association procedure being performed after the scanning procedure of the AP and the STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

In the IEEE 802.11 standard, in order to extend the life span of STAs of a wireless LAN, a power save mechanism (Power save Mode) is provided.

An STA, which operates based on the Power Save mode, may reduce its power consumption by operating while shifting to and from an awake state and a doze state, thereby extending the operation life span of the STA.

An STA being in the awake state may perform normal operations, such as transmission or reception of frames, channel scanning, and so on. Conversely, an STA being in the doze state does not perform any transmission or reception of frames and does not perform any channel scanning in order to reduce power consumption. An STA operating in the Power Save mode maintains the doze state in order to reduce power consumption, and, then, when required, the corresponding STA may perform a shift (or transition) to the awake modes so as to carry out communication with the AP.

As the duration time for maintaining the doze state of the STA becomes more extended, the power consumption of the STA may be required, and the life span of the STA may be extended. However, in the doze state, it is impossible for the STA to perform the transmission or reception of frames. if a pending uplink frame exists in the STA, the STA, which was operating in the Power Save mode, may shift from a doze state to an active state, or, if a pending uplink frame exists in the STA, the STA, which was operating in the Power Save mode, may shift from a Power Save mode to an Active mode, thereby being capable of transmitting an uplink frame to the AP. Conversely, in case a pending frame that is to be transmitted to the STA, which is being operated in the doze state, exists in the AP, the AP cannot transmit the pending frame to the STA before the shift of the STA to the Awake mode.

Therefore, the STA operating in the Power Save mode may occasionally shift from the doze state to the awake state and may receive information on whether or not any pending frame for the STA exists from the AP. Considering a shifting time of the STA operating in the Power Save mode to the awake state, the AP may transmit information on the presence of pending downlink data for the STA to the STA.

More specifically, in order to receive information on the presence or absence of a pending frame for the STA, the STA operating in the Power Save mode periodically shifts from the doze state to the awake state, thereby being capable of receiving the beacon frame. As a frame being used for the passive scanning of the STA, the beacon frame may include information on the capability of the AP. The AP may periodically (e.g., 100 msec) transmit a beacon frame to the STA.

Figure 4:
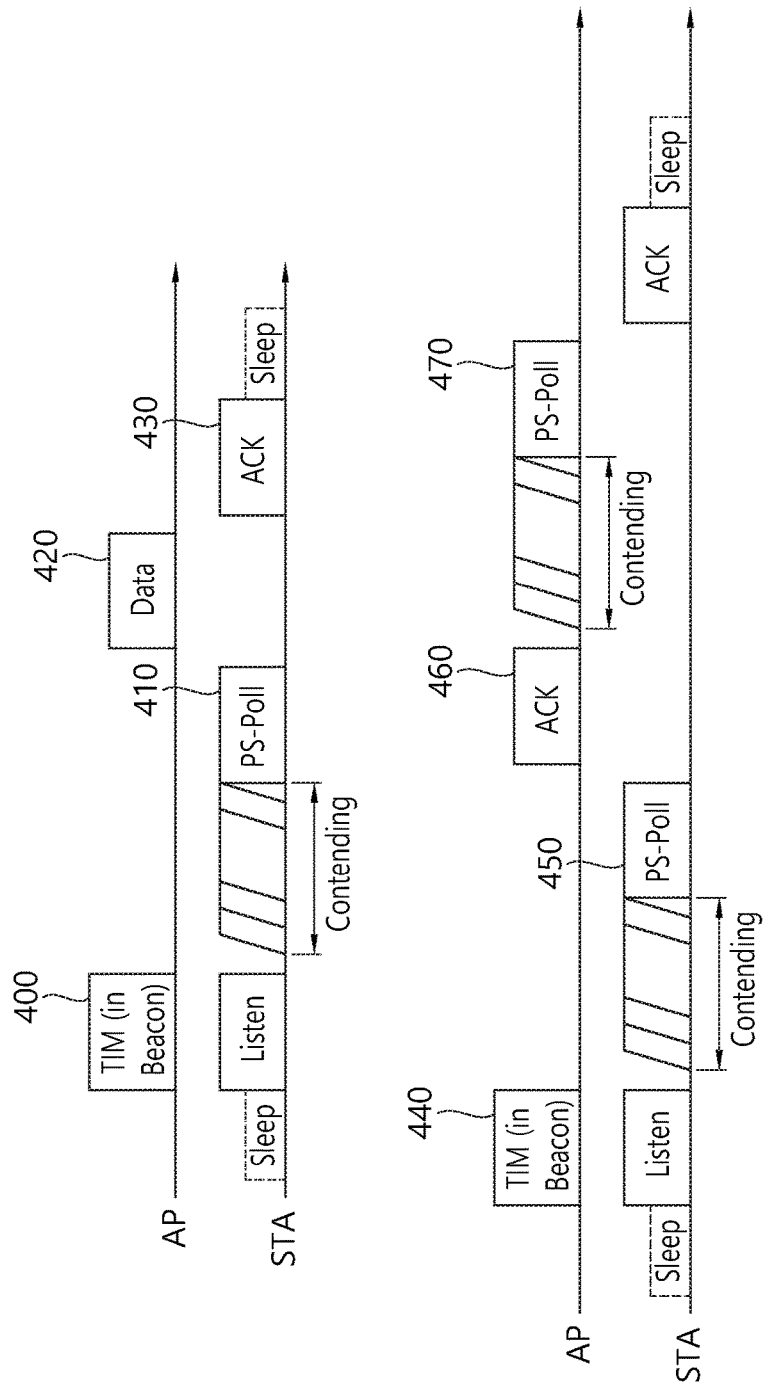
FIG. 4 is a conceptual view illustrating a power save method based on a beacon frame.

FIG. 4 is a conceptual view illustrating a power save method based on a beacon frame.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame. The beacon frame based Power Saving method may also be expressed by using the term TIM-based power save mode.

The beacon frame may include a traffic indication map (TIM) element. The TIM element may be used for transmitting the information on the pending downlink data for the STA to the AP. For example, the TIM element may include information on the pending downlink data for the STA based on a bitmap.

The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

Figure 5:
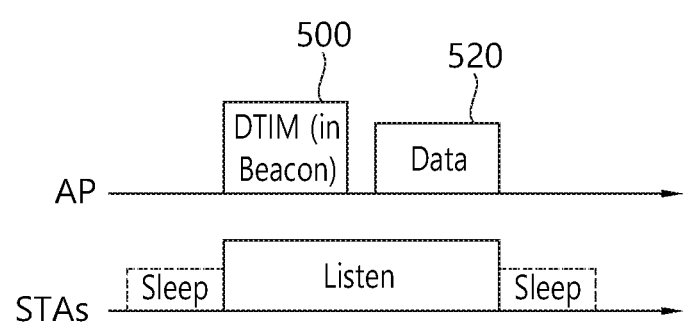
FIG. 5 is a conceptual view illustrating a power save method based on a beacon frame.

FIG. 5 is a conceptual view illustrating a power save method based on a beacon frame.

FIG. 5 discloses a case when a DTIM is delivered through a beacon frame 500. The beacon frame 500 may include a DTIM. As described above, the DTIM may indicate the presence of pending downlink data that are to be transmitted based on broadcast/multicast.

Referring to FIG. 5, the AP may transmit a beacon frame 500 including a DTIM to the STA. After receiving the beacon frame 500 including the DTIM, the STA may maintain the awake state without transmitting the PS-poll frame and may monitor the transmission of the downlink frame 520. The AP may transmit the downlink frame 520 to the STA by using the multicast method or the broadcast method.

Hereinafter, transmission from an AP to an STA may be expressed by the term "downlink transmission" in an embodiment of the present invention. A physical layer protocol data unit (PPDU), frame, and data transmitted through downlink transmission may be expressed respectively by the term "downlink PPDU", "downlink frame", and "downlink data". The PPDU may be a data unit including a PPDU header and a physical layer service data unit (PSDU) (or a MAC protocol data unit (MPDU)). The PPDU header may include a PHY header and a PHY preamble, and the PSDU (or MPDU) may include or indicate a frame. The PHY header may be expressed by the term "physical layer convergence protocol (PLCP) header", and the PHY preamble may be expressed by the term "PLCP preamble".

In addition, transmission from the STA to the AP may be expressed by the term "uplink transmission". A PPDU, frame, and data transmitted through uplink transmission may be expressed respectively by the term "uplink PPDU", "uplink frame", and "uplink data".

In a WLAN system, the STA may operate based on not only the aforementioned TIM-based power save mode but also a TXOP power save mode which is a TXOP-based power save mode.

A power management mode of the STA may be classified into an active mode and a power save mode. The aforementioned TIM-based power save mode is one of the power save modes.

The TXOP power save mode is one of the active modes. In general, the STA operating in the active mode maintains an awake state. However, the STA operating in the active mode may transition to a doze state during a TXOP duration for transmission of a frame of other STAs when a medium is occupied for transmission of the frame of other STAs.

If the STA operates in the TXOP power save mode, the STA may receive a downlink frame from an associated AP, and may determine whether to transition to the doze state or maintain the awake state, on the basis of a partial association identifier (AID) and a group identifier (ID) included in a PHY header (or a PLCP header) of a downlink PPDU which has carried the downlink frame.

For example, the STA may transition to the doze state when the group ID included in the PHY header of the received downlink PPDU is not matched with a group ID of the STA. Further, the STA may transition to the doze state when the group ID included in the PHY header of the received downlink PPDU is matched with the group ID of the STA but a PAID included in the PHY header of the downlink PPDU is not matched with a PAID of the STA.

In the conventional case, the STA operating in the TXOP power save mode transitions from the awake state to the doze state only when a received frame is a frame transmitted by an AP associated with the STA (or a BSS including the STA).

An embodiment of the present invention discloses a power save mode which supports a transition to a doze state of an STA when the STA receives a frame (or a PPDU) transmitted by other BSSs (or an AP or STA included in other BSSs). The power save mode may be expressed by the term "other BSS TXOP power save mode".

Figure 6:
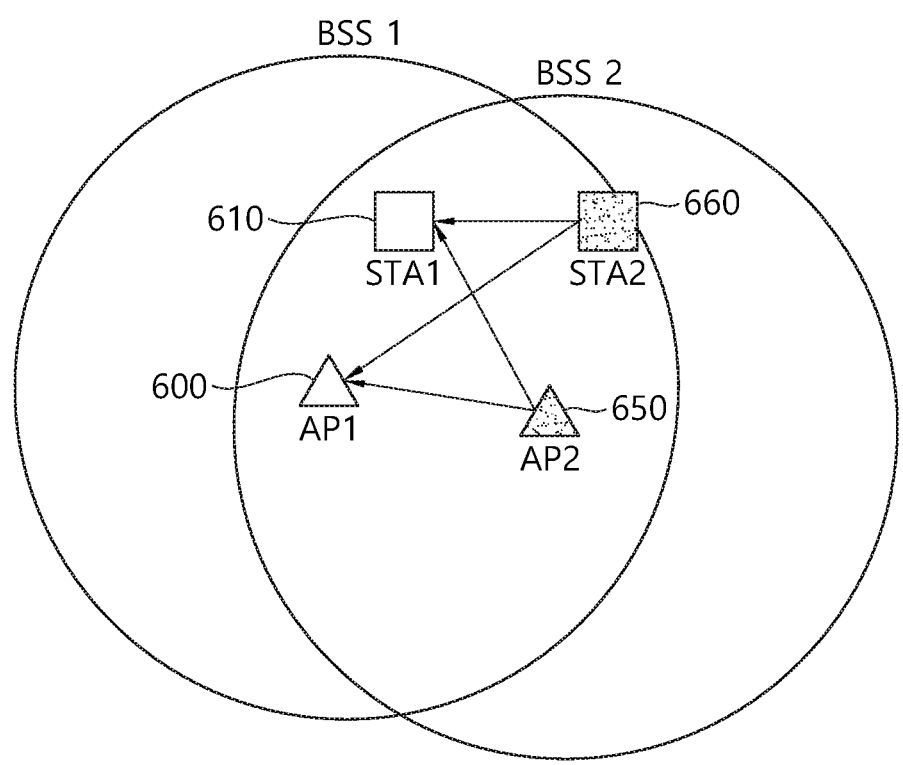
FIG. 6 is a conceptual view illustrating an "other basic service set (BSS) transmission opportunity (TXOP) power save mode" according to an embodiment of the present invention.

FIG. 6 is a conceptual view illustrating an "other BSS TXOP power save mode" according to an embodiment of the present invention.

A method in which an STA transitions to a doze state is shown in FIG. 6 when the STA and an AP receive a frame transmitted by other BSSs. The frame transmitted by other BSSs may be a frame transmitted by other APs or STAs included not in a BSS in which the STA is currently included but in other BSSs.

Referring to FIG. 6, an STA1 610 and an AP1 600 may be included in a BSS1, and an STA2 660 and an AP2 650 may be included in a BSS2. The BSS2 may be an overlapped basic service set (OBSS) for the BSS1.

The STA1 610 may be interfered by a frame transmitted by the BSS2. The frame transmitted by the BSS2 may include a downlink frame transmitted by the AP2 650 to the STA2 660 or an uplink frame transmitted by the STA2 660 to the AP2 650.

Upon receiving the frame transmitted by the BSS2, the STA1 610 may determine whether to operate in an awake state or a doze state on the basis of whether the API receives the frame transmitted by the BSS2. A frame transmitted by the other BSS with respect to a specific BSS such as the frame transmitted by the BSS2 allowing reception performed by the STA1 610 and/or the API 600 may be expressed by the term "other BSS frame".

If the API 600 receives a frame transmitted by the BSS2, the API 600 may defer downlink transmission to the STA1 610 to avoid inter-frame collision. Therefore, if the STA1 610 knows (or can predict) reception of the other BSS frame of the API 600, the STA1 610 may know that there is no downlink data transmission to the STA1 610 by the API 600. Accordingly, the STA1 610 may receive the frame transmitted by the BSS2, and may transition from the awake state to the doze state.

The STA1 610 may configure a specific duration determined (or configured) on the basis of TXOP duration related information included in the other BSS frame (or a PPDU carrying the other BSS frame), and may configure an NAV. The STA1 610 may maintain the doze state during the NAV duration.

On the contrary, if the STA1 610 does not know (or cannot predict) reception of the frame transmitted by the BSS2, the STA1 610 may know that there is no downlink data transmission by the API 600. Therefore, although the STA1 610 has received the frame transmitted by the BSS2, the awake state may be maintained to monitor a downlink frame transmitted by the API 600.

Hereinafter, an embodiment of the present invention discloses a method in which the STA1 610 operating in the other BSS TXOP power save mode transitions to the doze state on the basis of a prediction regarding whether the AP1 600 receives the other BSS frame. It is assumed that the STA1 is an STA operating in the other BSS TXOP power save mode.

In order to determine whether the AP1 600 receives the other BSS frame, the STA1 610 may receive information regarding the other BSS in which the AP1 600 can perform overhearing. More specifically, the AP1 600 may transmit to the STA1 610 the information regarding the other BSS in which overhearing is possible. The information regarding the other BSS in which the AP1 600 can perform overhearing may be expressed by the term "overhear BSS information (or overhearing other BSS information)". The overhear BSS information may be transmitted by being included in a PHY header (e.g., a high efficiency (HE)-signal (SIG) field) of a PPDU.

If the STA1 610 receives the other BSS frame, whether the other BSS which has transmitted the other BSS frame is one of other BSSs in which the AP1 600 can perform overhearing through the STA1 610 may be determined on the basis of the overhear BSS information received from the AP1 600.

If the other BSS which has transmitted the other BSS frame is one of other BSSs in which the AP1 600 can perform overhearing, the STA1 610 may assume (predict or determine) reception of the other BSS frame of the AP1 600. Therefore, the STA1 610 may transition to the doze state after reception of the other BSS frame.

On the contrary, if the other BSS which has transmitted the other BSS frame is not one of other BSSs in which the AP1 160 can perform overhearing, the STA1 610 may assume (or predict or determine) non-reception of the other BSS frame of the AP1 600. Therefore, the STA1 610 may maintain the awake state after reception of the other BSS frame.

The overhear BSS information may be transmitted from the AP1 600 to the STA1 610 through an initial access frame (e.g., beacon frame, probe response frame, association response frame, etc.) transmitted by the AP1. The overhear BSS information may include identification information for at least one BSS, in which overhearing is possible by the AP1 600, expressed based on a BSS color bit or a partial basic service set identifier (PBSSID).

For example, the BSS color bit may be used to identify the BSS as identification information of the BSS of X bits (e.g., X=3). The BSS color bit may be set by the AP, and the AP may transmit information regarding the set BSS color bit to the STA. The BSS color bit is one of integer values in the range of 0 to 7. As long as the BSS exists, the determined BSS color bit may be maintained.

The PBSSID may be used for identification of the BSS as identification information of the BSS of Y bits (e.g., Y=9). The PBSSID may be used to identify the BSS on the basis of some of bits constituting the BSSID for identifying the BSS. The BSSID may be unique identification information for the BSS as a 48-bit MAC address. For example, the PBSSID may be a least significant bit (LSB) of 9 bits of the BSSID.

That is, the STA operating in the other BSS power save mode may receive the overhear BSS information from the AP associated with the STA and obtain information of the other BSS in which overhearing is possible by the AP on the basis of the overhear BSS information. If the other BSS frame is received on the basis of the information of the other BSS in which overhearing is possible by the AP, the STA may determine whether to transition to the doze state. More specifically, the STA may determine whether a received PPDU includes the other BSS frame on the basis of PHY header information of the received PPDU. For example, upon receiving the other BSS frame, the STA may determine whether the received PPDU includes the other BSS frame on the basis of the BSS color bit and/or PBSSID obtained from the PHY header information of the PPDU including the other BSS frame.

If the BSS color bit and/or PBSSID included in the PHY header information of the received PPDU indicates the BSS included in the overhear BSS information (or if a BSS indicated by the BSS color bit and/or PBSSID included in the PHY header information of the received PPDU is matched with a BSS included in the overhear BSS information), the STA may transition to the doze state during a TXOP duration configured by the received other BSS frame (or a PPDU carrying the other BSS frame). The TXOP duration configured by the PPDU carrying the other BSS frame may be determined on the basis of a legacy-signal (L-SIG) field included in the PPDU carrying the other BSS frame. Alternatively, the TXOP duration configured by the other BSS frame may be determined on the basis of a duration field included in a MAC header of the other BSS frame.

The STA may configure an NAV during the TXOP duration and maintain the doze state. The STA may transition back to the awake state after the TXOP duration expires.

Hereinafter, a specific power save mode operation of an STA operating in the other BSS TXOP power save mode is disclosed according to an embodiment of the present invention.

Figure 7:
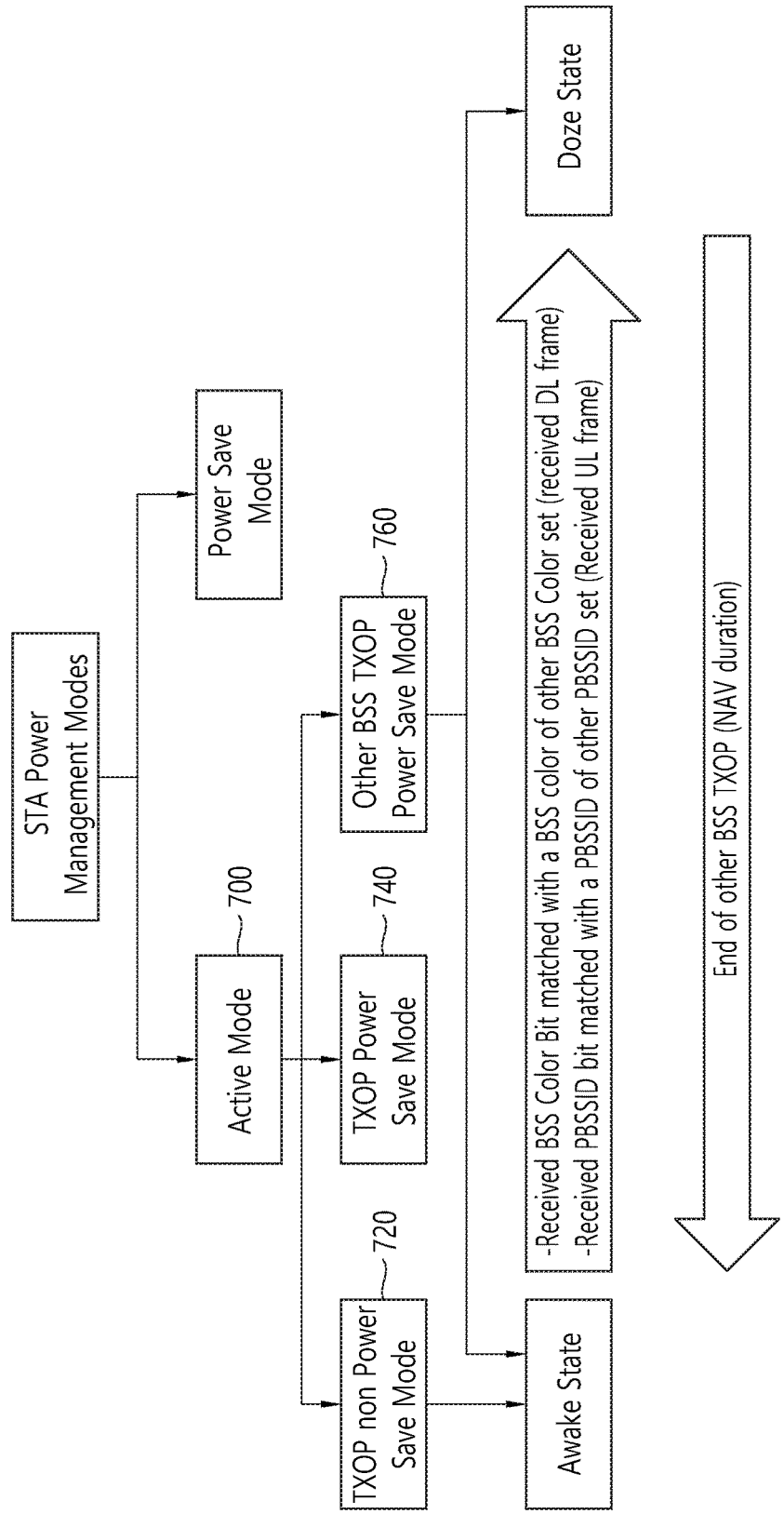
FIG. 7 is a conceptual view illustrating an "other BSS TXOP power save mode" of an STA according to an embodiment of the present invention.

FIG. 7 is a conceptual view illustrating an "other BSS TXOP power save mode" of an STA according to an embodiment of the present invention.

In FIG. 7, a transition to a doze state and an awake state is disclosed in the other BSS TXOP power save mode among power management modes of the STA.

Referring to FIG. 7, the BSS TXOP power save mode according to the embodiment of the present invention may be one of active modes 700.

If the STA operates in a TXOP non-power save mode 720, the STA may continuously maintain the awake state.

If the STA operates in a TXOP power save mode 740, the STA may transition to the doze state on a TXOP duration for transmission of a frame of other STAs and APs included in a BSS in which the STA is included.

If the STA operates in an "other BSS TXOP power save mode" 760 according to the embodiment of the present invention, the STA may also transition to the doze state not only on the TXOP duration of other STAs and APs included in the BSS in which the STA is included but also on a TXOP duration of other STAs and APs included in other BSSs in which the STA is not included. The other BSS TXOP power save mode 760 may indicate only an operational mode in which a transition is made to the doze state even on a TXOP duration for transmission of a frame of other STAs and APs included in other BSSs in which the STA is not included. That is, the other BSS TXOP power save mode may be a power save mode considering only an "other BSS frame" (the PPDU carrying the other BSS frame).

In the other BSS TXOP power save mode 760, if a color bit of a PPDU received by the STA corresponds to a color bit of a BSS included in overhear BSS information, the STA may transition from the awake state to the doze state. Alternatively, in the other BSS TXOP power save mode 760, the STA may transition from the awake state to the doze state if a PBSSID of the PPDU received by the STA corresponds to a PBSSID of a BSS included in the overhear BSS information.

The STA may maintain the doze state during the TXOP duration configured by the other BSS frame (the PPDU which has carried the other BSS frame). The TXOP duration may be configured on the basis of the duration field of the MAC header of the frame received from other BSSs or the legacy-signal (L-SIG) field of the PHY header of the PPDU which has carried the other BSS frame.

Hereinafter, in the embodiment of the present invention, the STA included in other BSSs may be expressed by the term "other BSS STA", and the AP included in other BSSs may be expressed by the term "other BSS AP". In addition, a frame (or PPDU) transmitted by the other BSS STA to the other BSS AP may be expressed by the term "other BSS uplink frame (or other BSS uplink PPDU)" and a frame (PPDU) transmitted by the other BSS AP to the other BSS STA may be expressed by the term "other BSS downlink frame (or other BSS downlink PPDU)".

Figure 8:
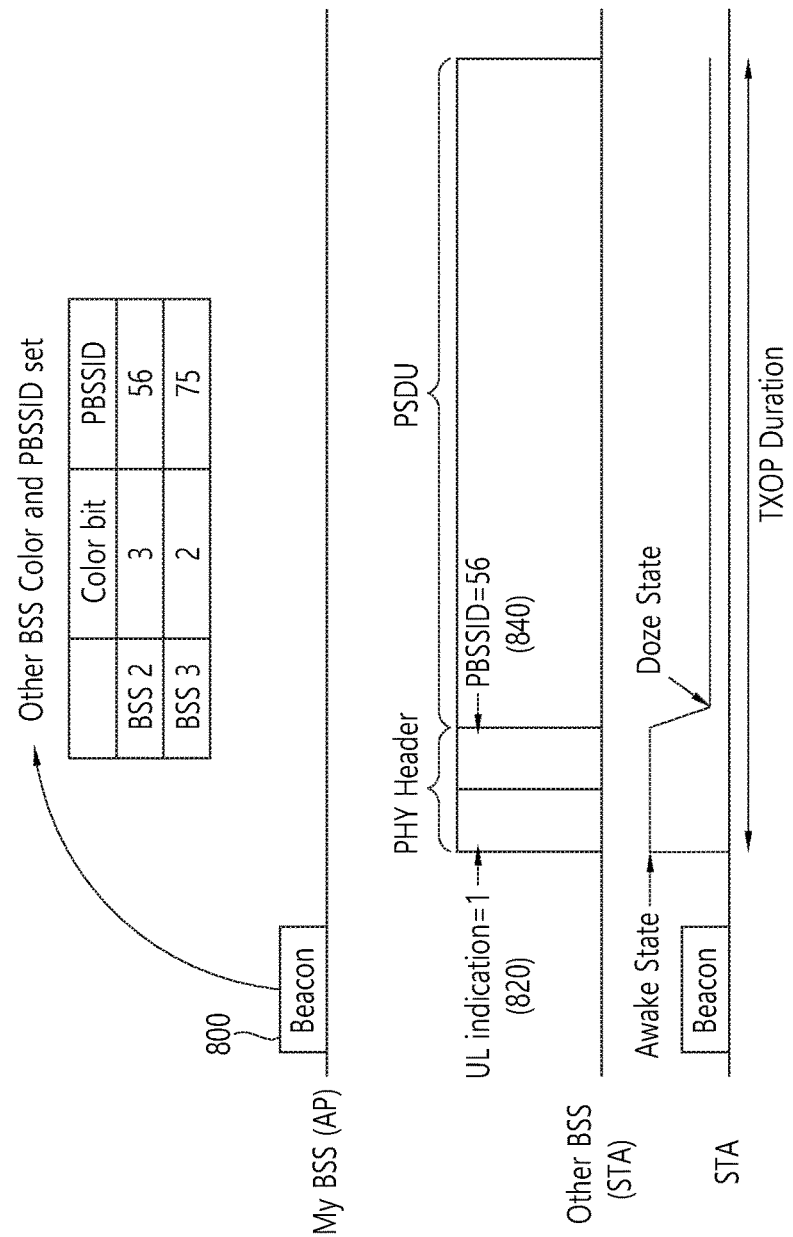
FIG. 8 is a conceptual view illustrating a transition to a doze state of an STA when an "other BSS frame" is received according to an embodiment of the present invention.

FIG. 8 is a conceptual view illustrating a transition to a doze state of an STA when an "other BSS frame" is received according to an embodiment of the present invention.

In FIG. 8, when the STA receives the other BSS frame from an STA included in other BSSs, the transition to the doze state of the STA is started.

Referring to FIG. 8, the STA may receive overhear BSS information from an associated AP. The overhear BSS information may include information regarding other BSSs for transmitting a frame receivable by the AP. In other words, the overhear BSS information may include information regarding other BSSs in which overhearing of the AP is possible. The overhear BSS information may include color bit information of other BSSs in which overhearing of the AP is possible and PBSSID information of other BSSs in which overhearing of the AP is possible.

As shown in FIG. 8, a beacon frame 800 transmitted by the AP may include overhear BSS information, and the overhear BSS information may include a color bit (=3) and PBSSID (=56) of a BSS2 in which overhearing is possible and a color bit (=2) and PBSSID (=75) of a BSS3 in which overhearing is possible.

The STA may decode the PHY header of the PPDU carrying the frame and determine whether the PPDU received on the basis of the decoded PHY header is transmitted by other BSSs and whether it is an uplink frame or a downlink frame transmitted on other BSSs. For example, the PHY header of the PPDU may include information indicating whether the PPDU is an uplink frame or a downlink frame and BSS identification information.

For example, the PHY header of the PPDU may include an uplink indication 820 and BSS identification information 840.

The uplink indication information 820 may include information indicating whether the PPDU (or frame) is an uplink PPDU (or an uplink frame) transmitted through uplink. For example, if the PPDU is an uplink PPDU frame transmitted by the STA to the AP, the uplink indication information 820 of the PHY header of the PPDU may indicate 1. On the contrary, if the PPDU is a downlink PPDU frame transmitted by the AP to the STA, the uplink indication information 820 of the PHY header of the PPDU may indicate 0.

In addition, the BSS identification information 840 may include the PBSSID information or color bits of the BSS including the STA or AP which has transmitted the PPDU (or frame).

The PHY header of the PPDU received by the STA may include the uplink indication information 820 and the BSS identification information 840. The uplink indication information 820 may include information indicating that the PPDU is the uplink PPDU. The BSS identification information 840 may include information indicating that it is transmitted from a BSS corresponding to a PBSSID (=56).

The STA may determine that the PPDUs received on the basis of the BSS identification information 840 and uplink indication information 820 included in the PHY header of the received PPDU are other BSS uplink PPDUs transmitted by other BSSs.

In this case, the STA may determine whether other BSS uplink PPDUs transmitted by other BSSs corresponding to the PBSSID (=56) can be received by the AP. The STA may determine whether other BSS uplink PPDUs transmitted by other BSSs corresponding to the PBSSID (=56) are receivable by the AP on the basis of whether other BSSs corresponding to the PBSSID (=56) are included in the overhear BSS information transmitted through the beacon frame.

Since the PBSSID (=56) of the BSS2 included in the overhear BSS information is matched with the PBSSID of other BSSs which have transmitted other BSS uplink PPDUs, the STA may predict reception of the AP regarding other BSS uplink PPDUs transmitted by other BSSs corresponding to the PBSSID (=56). The AP may not transmit a downlink frame to the STA in consideration of a TXOP duration configured by other BSS uplink PPDUs. Therefore, the STA may transition from an awake state to the doze state and maintain the doze state during the TXOP duration configured by other BSS uplink PPDUs.

That is, the STA may decode the uplink indication information 820 and BSS identification information 840 on the PHY header of the received PPDU, and if the PBSSID of the BSS included in the overhear BSS information is matched with the PBSSID of the BSS which has transmitted the received uplink PPDU, may transition from the awake state to the doze state. For example, the STA may decode the PHY header (or only up to the uplink indication information 820 and BSS identification information 840 in the PHY header) to determine whether to transition to the doze state.

Figure 9:
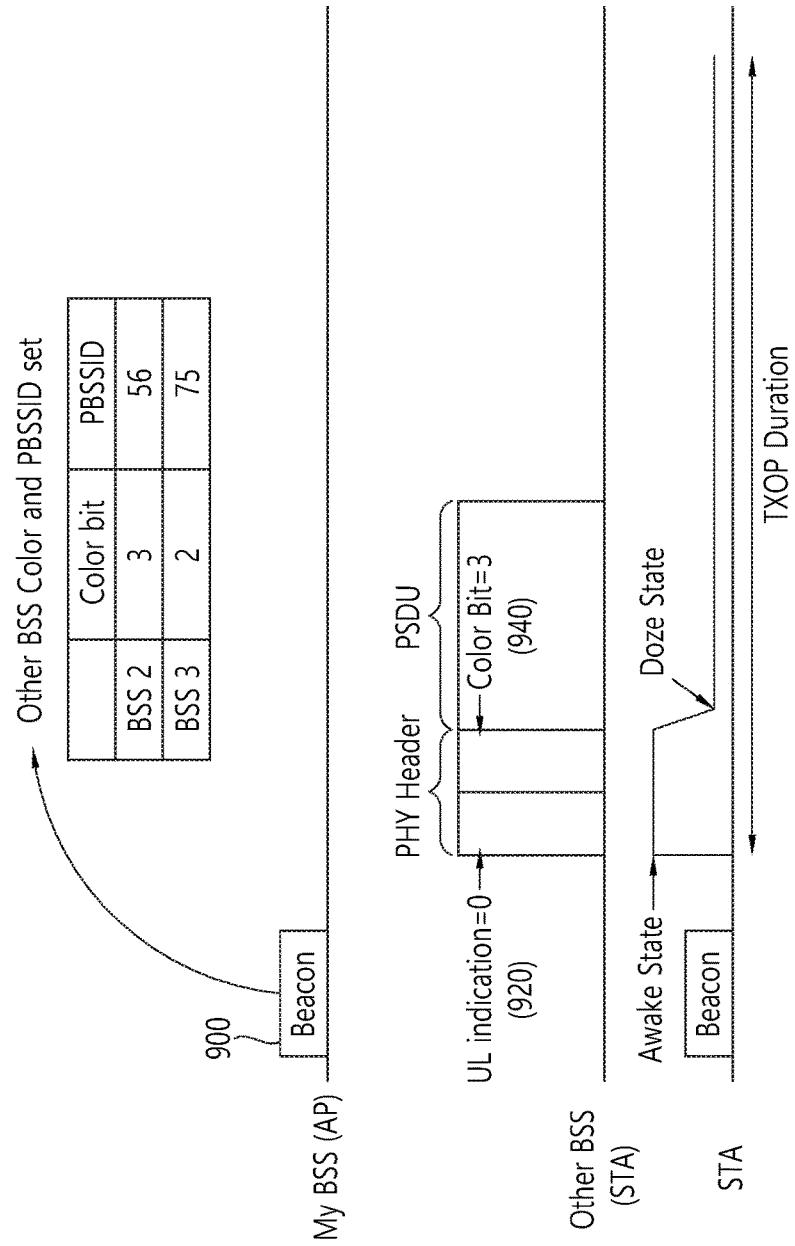
FIG. 9 is a conceptual view illustrating a transition to a doze state of an STA when an "other BSS frame" is received according to an embodiment of the present invention.

FIG. 9 is a conceptual view illustrating a transition to a doze state of an STA when an "other BSS frame" is received according to an embodiment of the present invention.

In FIG. 9, the transition of the STA to the doze state is disclosed when the STA receives the other BSS frame from an AP included in other BSSs.

Referring to FIG. 9, the STA may receive overhear BSS information from an associated AP via a beacon frame 900. The overhear BSS information may include a color bit (=3) and PBSSID (=56) of a BSS2 in which overhearing is possible and a color bit (=2) and PBSSID (=75) of a BSS3 in which overhearing is possible.

As described above, a PPDU received by the STA may include uplink indication information and BSS identification information of a PHY header. The uplink indication information 920 may include information indicating that the received PPDU is a downlink PPDU, and the BSS identification information 940 may include information indicating that the received PPDU is transmitted from a BSS corresponding to the color bit (=3).

The STA may determine that the PPDUs received on the basis of the uplink indication information 920 and BSS identification information 940 included in the PHY header of the received PPDU are other BSS downlink PPDUs transmitted by other BSSs.

In this case, the STA may determine whether other BSS downlink PPDUs transmitted by other BSSs corresponding to the color bit (=3) are receivable by the AP on the basis of the overhear BSS information.

Since the color bit (=3) of the BSS2 included in the overhear BSS information is matched with the color bit (=3) of other BSSs which have transmitted the received downlink PPDUs, the STA may predict reception of the AP for other BSS downlink PPDUs transmitted by other BSSs corresponding to the color bit (=3). The AP may not transmit a downlink frame to the STA by considering a TXOP duration configured by other BSS downlink PPDUs. Therefore, the STA may transition from an awake state to the doze state and maintain the doze state during the TXOP duration configured by other BSS downlink PPDUs.

That is, the STA may decode the uplink indication information 920 and the BSS identification information 940 on the PHY header of the received PPDU, and if the color bit of BSS included in the overhear BSS information is matched with the color bit of the other BSS which has transmitted the received uplink PPDU, may transition from the awake state to the doze state.

Figure 10:
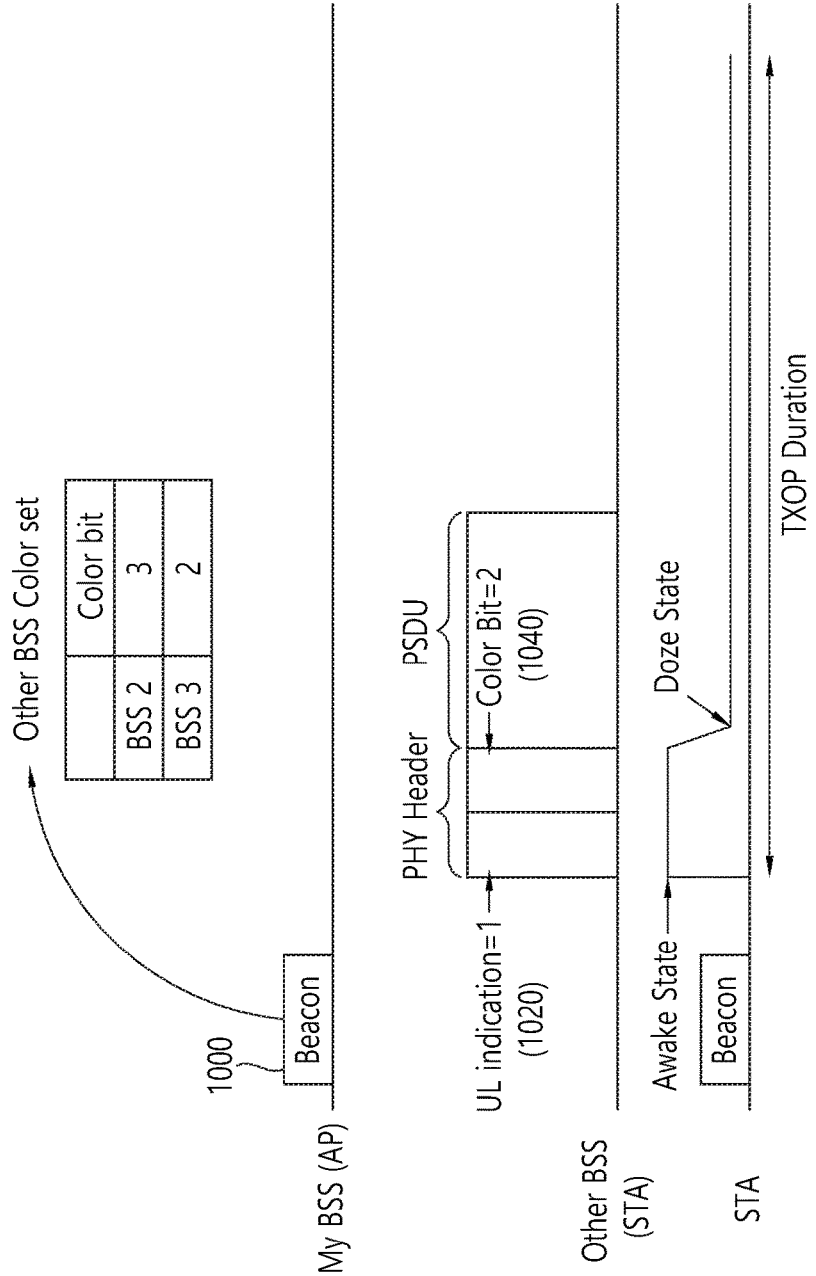
FIG. 10 is a conceptual view illustrating a transition to a doze state of an STA when an "other BSS frame" is received according to an embodiment of the present invention.

FIG. 10 is a conceptual view illustrating a transition to a doze state of an STA when an "other BSS frame" is received according to an embodiment of the present invention.

In FIG. 10, when the STA receives the other BSS frame from an AP included in other BSSs, the transition to the doze state of the STA is started. In particular, in FIG. 10, a case where a color bit is used as BSS identification information of other BSS uplink PPDUs are disclosed.

Referring to FIG. 10, the STA may receive overhear BSS information from an associated AP through a beacon frame 1000. The overhear BSS information may include a color bit (=3) of a BSS2 in which overhearing is possible and a color bit (=2) of a BSS3 in which overhearing is possible. If the color bit is used as BSS identification information of not only other BSS downlink frames but also other BSS uplink frames, the overhead BSS information may not include information on a PBSSID of other BSSs.

As described above, the PPDU received by the STA may include uplink indication information 1020 and BSS identification information 1040 of a PHY header. The uplink indication information 1020 may include information indicating that the PPDU is an uplink PPDU, and the BSS identification information 1040 may include information indicating that it is transmitted by the BSS corresponding to the color bit (=2). That is, the information on the BSS which has transmitted the uplink PPDU may be included in the uplink PPDU on the basis of not only a PBSSID but also color bit information.

The STA may determine that the received PPDUs are other BSS uplink PPDUs transmitted by other BSSs on the basis of the BSS identification information and uplink indication information included in the PHY header of the received PPDUs. In this case, the STA may determine whether other BSS uplink PPDUs transmitted by other BSSs corresponding to the color bit (=2) are receivable by the AP on the basis of the overhear BSS information.

Since a color bit (=2) of the BSS 3 included in the overhear BSS information is matched with a color bit (=2) of other BSSs which have transmitted the received uplink PPDUs, the STA may determine (predict or estimate) reception of the AP for other BSS uplink PPDUs transmitted by other BSSs. The AP may not transmit a downlink frame to the STA by considering a TXOP duration configured by other BSS uplink PPDUs. Therefore, the STA may transition from an awake state to the doze state, and may maintain the doze state during the TXOP duration configured by other BSS uplink PPDUs.

That is, the STA may decode the uplink indication information 1020 and the BSS identification information 1040 on the PHY header of the received PPDU, and if a color bit of a BSS included in the overhear BSS information is matched with a color bit of other BSSs which have transmitted the received uplink PPDUs, the STA may transition from the awake state to the doze state.

Figure 11:
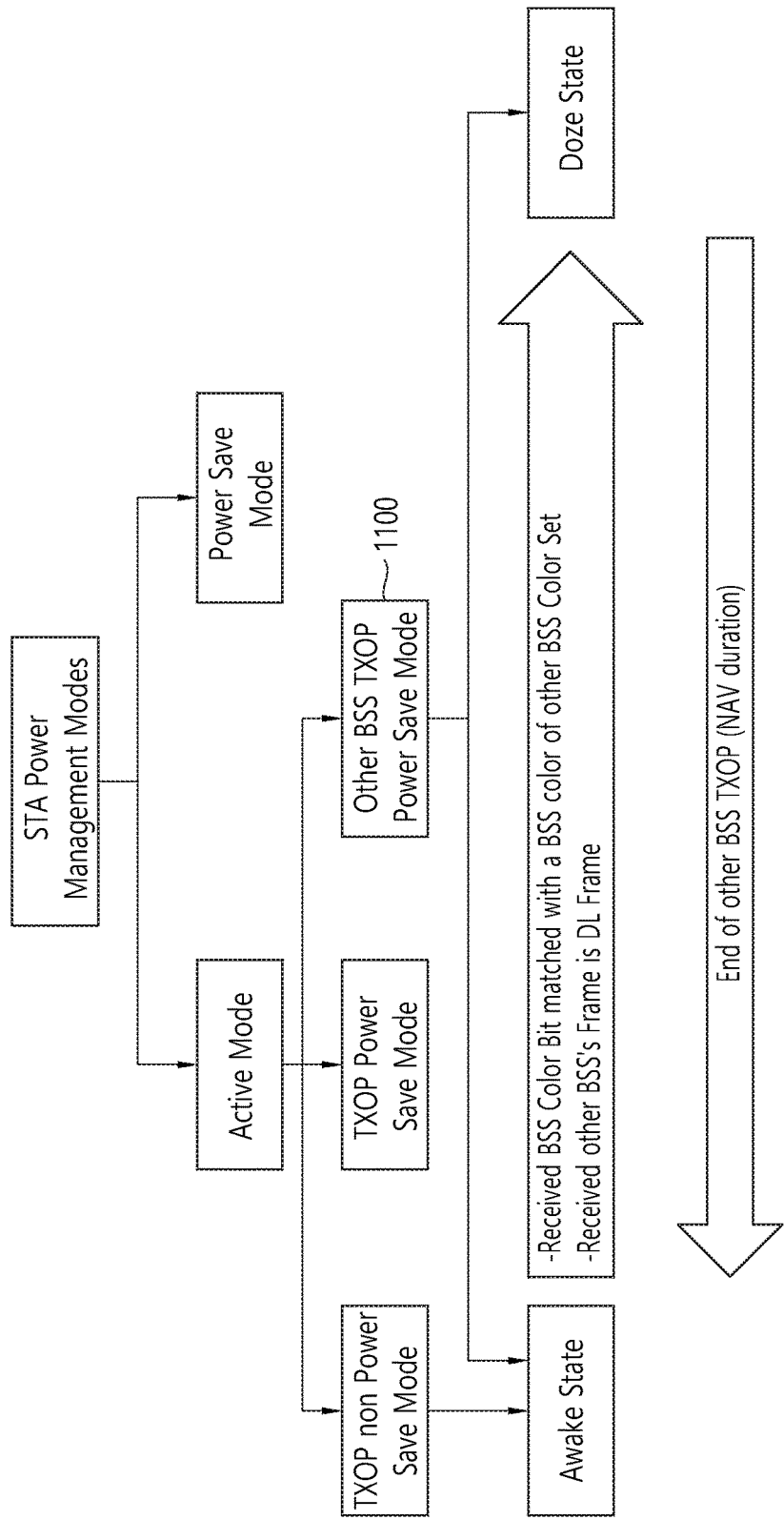
FIG. 11 is a conceptual view illustrating an "other BSS TXOP power save mode" of an STA according to an embodiment of the present invention.

FIG. 11 is a conceptual view illustrating an "other BSS TXOP power save mode" of an STA according to an embodiment of the present invention.

In FIG. 11, a transition to a doze state and an awake state is described in an "other BSS TXOP power save mode" 1100 among power management modes of the STA. In particular, the other BSS TXOP power save mode 1100 is disclosed which is used restrictively only for transmission of other BSS downlink frames (other BSS downlink PPDUs).

Referring to FIG. 11, when the STA operates in the other BSS TXOP power save mode 1100 according to the embodiment of the present invention, the STA may transition to the doze state not only on a TXOP duration of other STAs and APs included in a BSS in which the STA is included but also on a TXOP duration of other BSS APs included in other BSSs. If the TXOP duration of other BSS APs expires, the transition may be made back to the awake state.

The STA operating in the other BSS TXOP power save mode 1100 may transition to the doze state also on the TXOP duration of other BSS APs included in other BSSs in which the STA is not included, without consideration of the TXOP duration of other STAs and APs included in the BSS in which the STA is included. That is, the other BSS TXOP power save mode may be a power save mode considering only other BSS downlink frames (other BSS downlink PPDUs).

In the other BSS TXOP power save mode 1100, the STA may transition from the awake state to the doze state when a color bit or PBSSID of other BSS downlink PPDUs received by the STA corresponds to a color bit or PBSSID of a BSS included in the overhear BSS information.

Transmit power of other BSS uplink frames (or other BSS uplink PPDUs) may be less than transmit power of other BSS downlink frames (or other BSS downlink PPDUs). Therefore, other BSS uplink frames (or other BSS uplink PPDU) may not be overheard by an AP relatively in comparison with other BSS downlink frames (or other BSS downlink PPDUs). If the other BSS TXOP power save mode 1100 is applied to both of transmission of other BSS downlink frames (or other BSS downlink PPDUs) and other BSS uplink frames (or other BSS uplink PPDUs), there is a possibility of a false alarm. Therefore, in the embodiment of the present invention, the other BSS TXOP power save mode 1100 may be used restrictively only for transmission of other BSS downlink frames (or other BSS downlink PPDUs).

Figure 12:
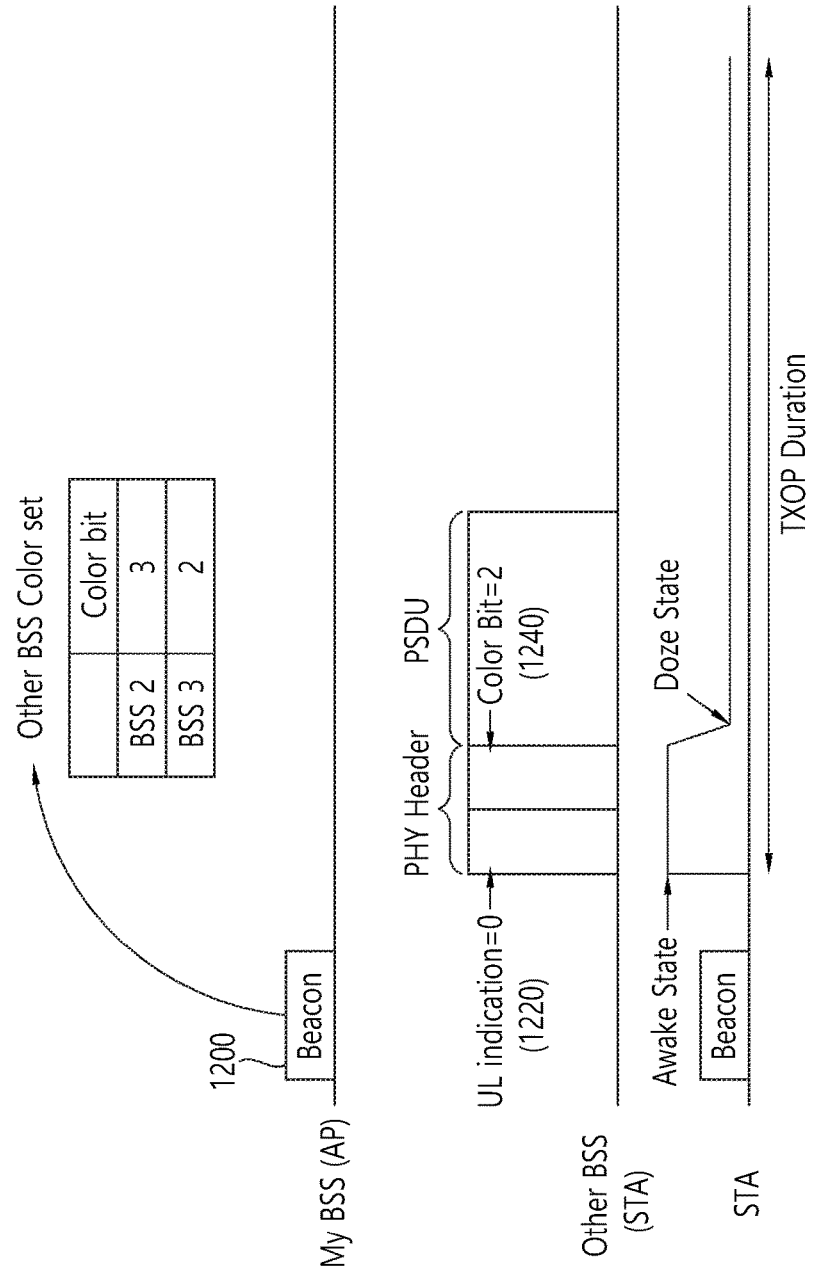
FIG. 12 is a conceptual view illustrating a transition to a doze state of an STA when an "other BSS frame" is received according to an embodiment of the present invention.

FIG. 12 is a conceptual view illustrating a transition to a doze state of an STA when an "other BSS frame" is received according to an embodiment of the present invention.

In FIG. 12, the other BSS TXOP power save mode applied only to transmission of other BSS downlink frames (other BSS downlink PPDUs) is started.

Referring to FIG. 12, the STA may obtain OBSS information through a beacon frame 1200 transmitted by an AP. Overhear BSS information may include information on a color bit (=3) of a BSS2 in which overhearing is possible and a color bit (=2) of a BSS3 in which overhearing is possible.

As described above, a PHY header of a PPDU received by the STA may include uplink indication information 1220 and BSS identification information 1240. The uplink indication information 1220 may include information indicating that the PPDU is a downlink PPDU, and the BSS identification information 1240 may include information indicating that it is transmitted by the BSS corresponding to the color bit (=2).

The STA may determine that the received PPDUs are other BSS downlink PPDUs on the basis of the uplink indication information 1220 and BSS identification information 1240 included in the PHY header of the received PPDUs. In this case, the STA may determine whether other BSS uplink PPDUs transmitted by other BSSs corresponding to the color bit (=2) are receivable by the AP on the basis of the overhear BSS information.

Since a color bit (=2) of the BSS 3 included in the overhear BSS information is matched with a color bit (=2) of other BSSs which have transmitted the received downlink PPDUs, the STA may predict reception of the AP for other BSS downlink PPDUs transmitted by other BSSs. The AP may not transmit a downlink frame to the STA by considering a TXOP duration configured by other BSS downlink PPDUs. Therefore, the STA may transition from an awake state to the doze state, and may maintain the doze state during the TXOP duration configured by other BSS downlink PPDUs.

The STA may decode the uplink indication information 1220 and BSS identification information 1240 on the PHY header of the received PPDU, and may transition from the awake state to the doze state only in case of other BSS downlink PPDUs transmitted by other BSSs.

That is, the STA operating in the other BSS TXOP power save mode may transition to the doze state restrictively only when the received PPDUs are other BSS downlink PPDUs transmitted by other BSSs.

The operation of the other BSS TXOP power save mode of the STA according to the embodiment of the present invention may be configured on the basis of various methods. Hereinafter, a method of configuring the operation of the other BSS TXOP power save mode is disclosed according to the embodiment of the present invention.

According to the embodiment of the present invention, the operation of the other BSS TXOP power save mode of the STA may be configured on the basis of a No TXOP power save mode bit. The operation of the other BSS TXOP power save mode of the STA may be configured on the basis of a value of the No TXOP power save mode bit.

More specifically, when a frame including the No TXOP power save bode bit set to 0 between the STA and an AP is transmitted and received, the STA may operate based on the other BSS TXOP power save mode. For example, the STA may report (or request) the frame including the No TXOP power save mode bit value 0 to the AP to report (or request) the other BSS TXOP power save mode operation of the STA. The AP may transmit the frame including the No TXOP power save mode bit value 0 to the STA to set (or allow) the other BSS TXOP power save mode operation of the STA.

The No TXOP power save mode bit may also be used to indicate the TXOP power save mode operation of the STA. In this case, the STA may operate based on the TXOP power save mode and the other BSS TXOP power save mode when the frame including the No TXOP power save mode bit set to 0 between STA and AP is transmitted and received.

In a step of associating with the AP, the STA may transmit capability information for the other BSS TXOP power save mode operation of the STA to the AP to negotiate capability of the BSS TXOP power save mode operation with the AP.

For example, the STA may transmit information regarding the capability of the other BSS TXOP power save mode by including it to an extended capabilities element of an association request frame. Further, the AP may transmit an association response frame in response to the association request frame, and in this case, the association response frame may include an extension capability element including information on whether the STA supports (or permits) the other BSS TXOP power save mode.

According to another embodiment of the present invention, the STA may operate based on the other BSS TXOP power save mode without a pre-negotiation procedure for the other BSS TXOP power save mode between the STA and the AP. If the other BSS frame is received regardless of the setting of the aforementioned No TXOP power save mode bit, the STA may operate in the other BSS TXOP power save mode.

Further, according to another embodiment of the present invention, the other BSS TXOP power save mode bit may be defined to set only the other BSS TXOP power save mode. The aforementioned No TXOP power save mode bit may be used to set an operation of not only the other BSS TXOP power save mode but also the TXOP power save mode. However, the other BSS TXOP power save mode bit may be used only for the other BSS TXOP power save mode.

For example, if the other BSS TXOP power save mode bit is 0, it may indicate that the other BSS TXOP power save mode operation is not performed, and if the other BSS TXOP power save mode bit is 1, it may indicate that the other BSS TXOP power save mode operation is performed.

The STA may transmit the frame including the other BSS TXOP power save mode bit having a value of 1 to the AP to report the operation in the other BSS TXOP power save mode to the AP. Further, the STA may also operate in the other BSS TXOP power save mode upon receiving from the AP the frame including the other BSS TXOP power save mode bit having the value of 1.

Figure 13:
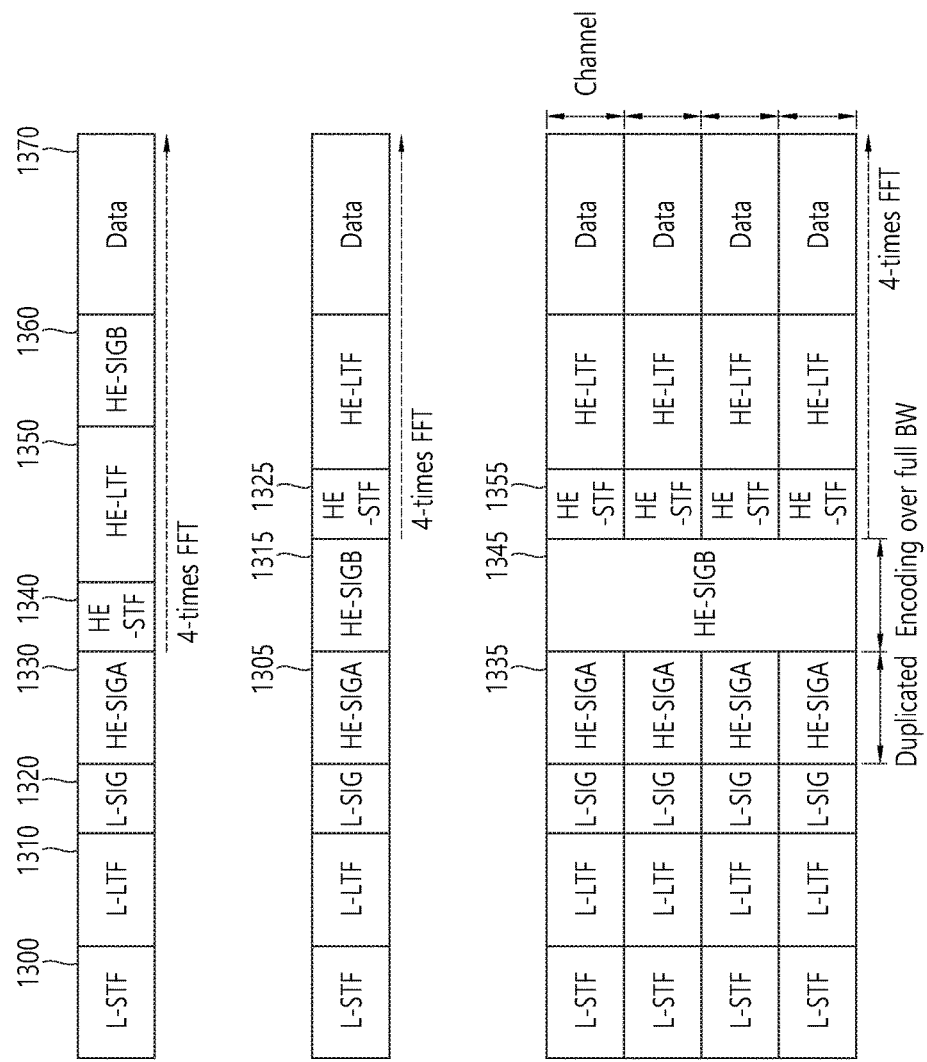
FIG. 13 is a conceptual view illustrating a physical layer protocol data unit (PPDU) format for carrying a frame according to an embodiment of the present invention.

FIG. 13 is a conceptual view illustrating a PPDU format for carrying a frame according to an embodiment of the present invention.

In FIG. 13, it is disclosed a PPDU format according to the embodiment of the present invention. A PPDU may include a PPDU header and a MAC protocol data unit (MPDU) (or a physical layer service data unit (PSDU)). A frame may correspond to the MPDU. The PPDU header of the PPDU format may be considered as including the PHY header of the PPDU and a PHY preamble.

The PPDU format disclosed in FIG. 13 may be used to carry the aforementioned frame (e.g., other BSS frames, beacon frames, etc.).

Referring to an upper portion of FIG. 13, the PHY header of the downlink PPDU may include a legacy-short training field (L-STF), a legacy-long training field (L-LTF), a legacy-signal (L-SIG), a high efficiency-signal A (HE-SIG A), a high efficiency-short training field (HE-STF), a high efficiency-long training field (HE-LTF), and a high efficiency-signal B (HE-SIG B). The PHY header may be divided into a legacy part before the L-SIG and a high efficiency (HE) part after the L-SIG.

An L-STF 1300 may include a short training orthogonal frequency division multiplexing (OFDM) symbol. The L-STF 1300 may be used for frame detection, automatic gain control (AGC), diversity detection, and coarse frequency/time synchronization.

An L-LTF 1310 may include a long training OFDM symbol. The L-LTE 1310 may be used for fine frequency/time synchronization and channel prediction.

An L-SIG 1320 may be used to transmit control information. The L-SIG 1320 may include information for a data rate and a data length.

An HE-SIG A 1330 may include identification information of an STA for indicating a target STA for receiving a downlink PPDU. The STA may determine whether to receive information included in the HE-SIG A 1330 by using the PPDU on the basis of identification information of the target STA. If the STA is indicated on the basis of the HE-SIG A 1330 of the downlink PPDU, the STA may perform additional decoding on the downlink PPDU. Further, the HE-SIG A 1330 may also include information on resources (frequency resources (or subbands)) for receiving downlink data (in case of orthogonal frequency division multiplexing (OFDMA)-based transmission) or space-time stream resources (in case of multiple input multiple output (MIMO)-based transmission).

Further, the HE-SIG A 1330 may include color bits information for BSS identification, bandwidth information, a tail bit, a CRC bit, modulation and coding scheme (MCS) information for an HE-SIG B 1360, symbol count information for the HE-SIG B 1360, and cyclic prefix (CP) (or guard interval (GI)) length information.

Further, the HE-SIG A 1330 may also include uplink transmission indication information and BSS identification information (e.g., color bits, PBSSID) to determine whether the STA operating in the other BSS TXOP power saving mode transitions to a doze state.

An HE-STF 1340 may be used to improve automatic gain control estimation in an MIMO environment or an OFDMA environment.

An HE-LTF 1350 may be used to estimate a channel in the MIMO environment or the OFDMA environment.

The HE-SIG B 1360 may include a length of physical layer service data unit (PSDU) for each STA, information regarding modulation and coding scheme (MCS), a tail bit, or the like.

A size of IFFT applied to the HE-STF 1340 and a field next to the HE-STF 1340 may be different from a size of IFFT applied to a field prior to the HE-STF 1340. For example, the size of IFFT applied to the HE-STF 1340 and the field next to the HE-STF 1340 may be four times greater than the size of IFFT applied to the field prior to the HE-STF 1340. If the STA may receive a downlink frame, the STA may decode the HE-SIG A 1330 of the downlink frame, and may determine whether to decode a field next to the HE-SIG A 1330 on the basis of target STA's identifier information included in the HE-SIG A 1330. In this case, if the target STA's identifier information included in the HE-SIG A 1330 indicates an identifier of the STA, the STA may perform decoding on the HE-STF 1340 and the field next to the HE-STF 1340 on the basis of a changed FFT size. On the contrary, if the STA's identifier information included in the HE-SIG A 1330 does not indicate the identifier of the STA, the STA may stop decoding and may configure a network allocation vector (NAV). A cyclic prefix (CP) of the HE-STF 1340 may have a size greater than a CP of another field, and for this CP duration, the STA may perform decoding on the downlink PPDU by changing the FFT size.

An order of the field constructing the format of the PPDU disclosed in the upper portion of FIG. 13 may be changed. For example, as disclosed in a middle portion of FIG. 13, an HE-SIG B 1315 of an HE part may be located immediately next to an HE-SIG A 1305. The STA may perform decoding on the HE-SIG 1305 and up to the HE-SIG B 1315, may receive necessary control information, and may configure an NAV. Likewise, a size of IFFT applied to an HE-STF 1325 and a field next to the HE-STF 1325 may be different from a size of IFFT applied to a field prior to the HE-STF 1325.

The STA may receive the HE-SIG A 1305 and the HE-SIG B 1315. If it is instructed to receive the downlink PPDU by the target STA's identifier of the HE-SIG A 1305, the STA may perform decoding on the downlink PPDU starting from the HE-STF 1325 by changing the FFT size. On the contrary, the STA may receive the HE-SIG A 1305, and if it is not instructed to receive the downlink PPDU on the basis of the HE-SIG A 1305, may configure the NAV.

Referring to a lower portion of FIG. 13, a downlink PPDU format for DL MU transmission is disclosed. A downlink PPDU may be transmitted to an STA through different downlink transmission resources (frequency resources or spatial streams) on the basis of OFDMA. That is, downlink data may be transmitted to a plurality of STAs through a plurality of subbands on the basis of the downlink PPDU format for the DL MU transmission.

A field prior to an HE-SIG B 1345 on the downlink PPDU may be transmitted in a duplicated form in each of different downlink transmission resources. The HE-SIG B 1345 may be transmitted on all transmission resources in an encoded form. A field next to the HE-SIG B 1345 may include individual information for each of the plurality of STAs for receiving the downlink PPDU.

If the field included in the downlink PPDU is transmitted through each of the downlink transmission resources, a CRC for each field may be included in the downlink PPDU. On the contrary, if a specific field included in the downlink PPDU is transmitted by being encoded on all downlink transmission resources, a CRC for each field may not be included in the downlink PPDU. Therefore, an overhear for the CRC may be decreased. That is, the downlink PPDU format for DL MU transmission according to the embodiment of the present invention can reduce the CRC overhead of the downlink frame by using the HE-SIG B 1345 in an encoded form on the entire transmission resource.

Likewise, also in a downlink PPDU format for DL MU transmission, an HE-STF 1355 and a field next to the HE-STF 1355 may be encoded on the basis of an IFFT size different from that of a field prior to the HE-STF 1355. Therefore, the STA may receive an HE-SIG A 1335 and the HE-SIG B 1345, and if it is instructed to receive the downlink PPDU on the basis of the HE-SIG A 1335, may perform decoding on the downlink PPDU by changing an FFT size.

Figure 14:
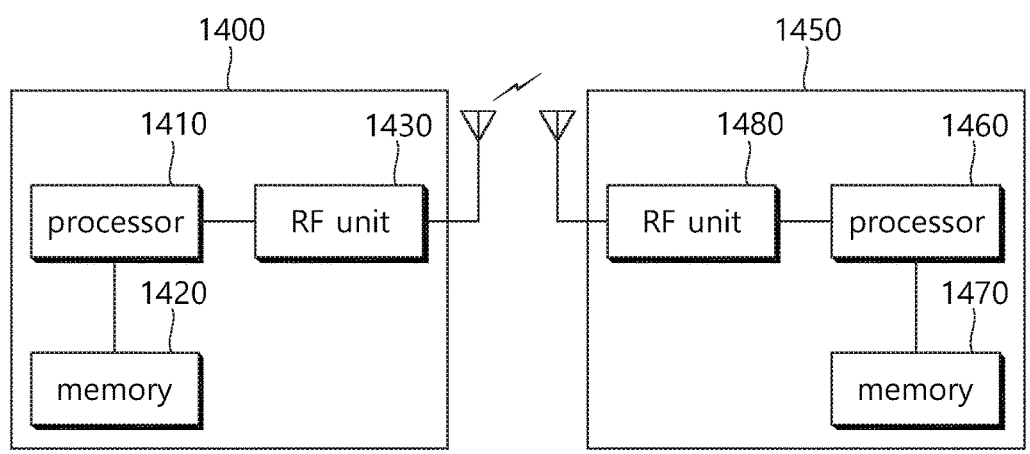
FIG. 14 is a block diagram illustrating a wireless device according to an embodiment of the present invention.

FIG. 14 is a block diagram illustrating a wireless device according to an embodiment of the present invention.

Referring to FIG. 14, a wireless device 1400 is an STA capable of implementing the aforementioned embodiment, and may be an AP 1400 or a non-AP STA (or STA) 1450.

The AP 1400 includes a processor 1410, a memory 1420, and a radio frequency (RF) unit 1430.

The RF unit 1430 may be coupled to the processor 1410 to transmit/receive a radio signal.

The processor 1410 may implement the functions, procedures, and/or methods proposed in the present invention. For example, the processor 1410 may be configured to perform an operation of the wireless device according to the aforementioned embodiment of the present invention. The processor may perform the operation of the wireless device disclosed in the embodiment of FIG. 1 to FIG. 13.

For example, the processor 1410 may be implemented to generate overhear BSS information by searching for a BSS in which overhearing is possible and to transmit the overhear BSS information to the STA. Further, the processor 1410 may configure other BSS TXOP power save mode operations of the STA.

An STA 1450 includes a processor 1460, a memory 1470, and an RF unit 1480.

The RF unit 1480 may be coupled to the processor 1460 to transmit/receive a radio signal.

The processor 1460 may implement the functions, procedures, and/or methods proposed in the present invention. For example, the processor 1420 may be configured to perform an operation of the wireless device according to the aforementioned embodiment of the present invention. The processor may perform the operation of the wireless device disclosed in the embodiment of FIG. 1 to FIG. 13.

For example, the processor 1460 may be implemented to receive overhear BSS information from the AP, receive a PPDU, and determine whether the overhear BSS information includes information on the BSS. In addition, the processor 1460 may be implemented to transition from an awake state to a doze state when the overhear BSS information includes the information on the BSS. The PPDU may include information on a BSS which has transmitted the PPDU, and the overhear BSS information may include information on at least one overhear BSS for transmitting a frame that can be overheard by the AP.

The processors 1410 and 1460 may include application-specific integrated circuits (ASICs), other chipsets, logical circuits, data processing devices, and/or converters for mutually converting a baseband signal and a radio signal. The memories 1420 and 1470 may include a read-only memory (ROM), a random access memory (RAM), a flash memory, a memory card, a storage medium and/or other storage devices. The RF units 1430 and 1480 may include at least one antenna to transmit and/or receive the radio signal.

When the above-described embodiment is implemented in software, the above-described scheme may be implemented using a module (process or function) which performs the above function. The module may be stored in the memories 1420 and 1470 may be and executed by the processors 1410 and 1460. The memories 1420 and 1470 may be disposed to the processors 1410 and 1460 internally or externally and connected to the processors 1410 and 1460 using a variety of well-known means.

What is claimed is:

1. An operating method based on a power save mode in a wireless local area network (WLAN), the method comprising:

receiving, by a first station (STA) belonging to a first basic service set (BSS), overhear BSS information from a first access point (AP) belonging to the first BSS, wherein the overhear BSS information includes information on at least one overhear BSS overheard by the first AP among a plurality of second BSSs overlapping with the first BSS;

when a physical layer protocol data unit (PPDU) is received at the first STA, decoding, by the first STA, a physical (PHY) header of the PPDU, wherein the PHY header includes BSS color information on which transmission BSS the PPDU is transmitted from;

determining, by the first STA, whether the BSS color information is included in the overhear BSS information; and if it is determined that the BSS color information is included in the overhear BSS information, transitioning, by the first STA, a power state of the first STA from an awake state to a doze state after decoding the PHY header.

2. The method of claim 1,
wherein the overhear BSS information further includes color bit information or partial basic service set identifier (PBSSID) information for the at least one overhear BSS, and
wherein the BSS color information comprises color bit information or PBSSID information for the transmission BSS.

3. The method of claim 2,
wherein the PPDU further comprises uplink indication information,
wherein the uplink indication information indicates transmission of the PPDU by other APs included in the transmission BSS or transmission of the PPDU by other STAs included in the transmission BSS,
wherein the PPDU comprises the color bit information for the transmission BSS if the uplink indication information indicates transmission of the PPDU by other APs included in the transmission BSS, and
wherein the PPDU comprises the PBSSID information for the transmission BSS if the uplink indication information indicates transmission of the PPDU by other STAs included in the transmission BSS.

4. The method of claim 3, wherein transitioning the power state of the first STA from the awake state to the doze state comprises:
transitioning the power state from the awake state to the doze state if the uplink indication information indicates transmission by other APs included in the transmission BSS and the color bit information for the transmission BSS is included in the color bit information for the at least one overhear BSS; and
transitioning the power state from the awake state to the doze state if the uplink indication information indicates transmission by other STAs included in the transmission BSS and the PBSSID information for the transmission BSS is included in the PBSSID information of the at least one overhear BSS.

5. The method of claim 1,
wherein the overhear BSS information is included in a beacon frame periodically transmitted by the first STA.

6. A first station (STA) operating based on a power save mode in a wireless local area network (WLAN), the first STA belonging to a first basic service set (BSS) and comprising:
a radio frequency (RF) unit for transmitting or receiving a radio signal; and
a processor operatively coupled to the RF unit,
wherein the processor is configured for:
receiving overhear BSS information from a first access point (AP) belonging to the first BSS,
wherein the overhear BSS information includes information on at least one overhear BSS overheard by the first AP among a plurality of second BSSs overlapping with the first BSS;

when a physical layer protocol data unit (PPDU) is received at the first STA, decoding a physical (PHY) header of the PPDU,
wherein the PHY header includes BSS color information on which transmission BSS the PPDU is transmitted from;
determining whether the BSS color information is included in the overhear BSS information; and
if it is determined that the BSS color information is included in the overhear BSS information, transitioning a power state of the first STA from an awake state to a doze state after decoding the PHY header.

7. The first STA of claim 6,
wherein the overhear BSS information further includes color bit information or partial basic service set identifier (PBSSID) information for the at least one overhear BSS, and
wherein the BSS color information comprises color bit information or PBSSID information for the transmission BSS.

8. The first STA of claim 7,
wherein the PPDU further comprises uplink indication information,
wherein the uplink indication information indicates transmission of the PPDU by other APs included in the transmission BSS or transmission of the PPDU by other STAs included in the transmission BSS,
wherein the PPDU comprises the color bit information for the transmission BSS if the uplink indication information indicates transmission of the PPDU by other APs included in the transmission BSS, and
wherein the PPDU comprises the PBSSID information for the transmission BSS if the uplink indication information indicates transmission of the PPDU by other STAs included in the transmission BSS.

9. The first STA of claim 8, wherein the processor is further configured for:
transitioning the power state of the first STA from the awake state to the doze state if the uplink indication information indicates transmission by other APs included in the transmission BSS and the color bit information for the transmission BSS is comprised in the color bit information for the at least one overhear BSS; and
transitioning the power state of the first STA from the awake state to the doze state if the uplink indication information indicates transmission by other STAs included in the transmission BSS and the PBSSID information for the transmission BSS is included in the PBSSID information of the at least one overhear BSS.

10. The first STA of claim 6,
wherein the overhear BSS information is included in a beacon frame periodically transmitted by the first STA.

* * * * *